Figure 1:
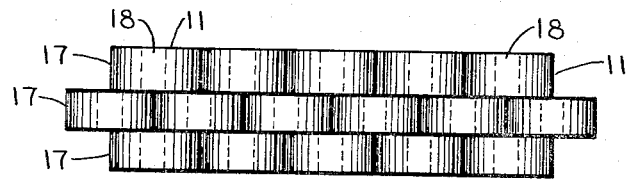

Jan. 26, 1954      J. P. SWENTZEL      2,667,343
HEAT TRANSFER CHECKER WORK AND UNIT SHAPES THEREFOR
Filed July 22, 1950      2 Sheets-Sheet 1

*INVENTOR.*
JOHN P. SWENTZEL
BY
ATTORNEY

Jan. 26, 1954    J. P. SWENTZEL    2,667,343
HEAT TRANSFER CHECKER WORK AND UNIT SHAPES THEREFOR
Filed July 22, 1950    2 Sheets-Sheet 2

INVENTOR.
JOHN P. SWENTZEL
BY
ATTORNEY

UNITED STATES PATENT OFFICE 2,667,343

HEAT TRANSFER CHECKER WORK AND UNIT SHAPES THEREFOR

John P. Swentzel, Niagara Falls, N. Y., assignor to The Carborundum Company, Niagara Falls, N. Y., a corporation of Delaware Application July 22, 1950, Serial No. 175,357

8 Claims. (Cl. 263—51)

1

This invention relates to new and improved heat transfer checker work systems and to new and improved unit shapes therefor.

One method of cracking oil and manufacturing gas involves passing the oil to be cracked through a chamber containing an open checker work of refractory brick or shapes which has previously been heated to a temperature sufficient to crack the oil and form the desired gas together with other by-product materials. Operations are carried on by first preheating the refractory checker work to the desired high temperature, as for example 1000° C., after which the heating burners are shut off or other source of heat withdrawn and a supply of oil passed through the hot checker work. The heat stored up in the checker work is transferred to the oil passing through the system whereby the oil is cracked and the by-products therefrom withdrawn from the system. As soon as the temperature of the checker work has been lowered to a point where it is no longer effective in bringing about the cracking of the oil, as for example, a temperature in the neighborhood of 400° C., the flow of oil through the checker work is stopped and the heating burners or other source of heat again turned on the checker work which is reheated to its maximum desired operating temperature. The complete heating and cooling cycle for such systems is usually a matter of minutes. For instance, a typical operating schedule calls for heating the furnace for a period of 15 minutes followed by a cracking period of similar duration. The operation of such a heat transfer checker work subjects it to very severe fluctuations in temperature under which the individual shapes making up the checker work soon undergo cracking and spalling to the point where the checker work breaks down and fails to perform efficiently.

Heretofore, the most common form of heat transfer checker work has been a system composed of a suitably sized chamber substantially filled with an open network of refractory bricks of conventional rectangular shape, the bricks being spaced from one another in a plurality of horizontal courses which are criss-crossed by the bricks of adjacent courses to form an open network of bricks through which the oil and gases can be passed. Such systems composed of bricks of standard size and shape have proven unsatisfactory because of the inability of the individual bricks making up the checker work to withstand the tremendous heat shock involved in such operations. It is obvious that the failure of one or two bricks, particularly in the lower

2 courses of such a checker work, causes the higher courses of the system to collapse so that instead of having a heat transfer system of controlled construction the material is piled up in the lower portion of the chamber more or less in the form of a rubble. The least disruption of such a heat transfer system not only lowers its effectiveness in operation but furthermore hastens its failure by interfering with satisfactory cleaning operations which are required because of the deposition of carbon upon portions of the system.

Numerous attempts have been made to promote greater efficiency in such heat transfer systems by the design of specially shaped unit structures which can be interlocked or fitted together so as to render the system structurally stronger than a system composed of standard brick shapes. However, such specially designed systems have never met with much success since any slight increase in efficiency thusly obtained has been accompanied by an increase in the cost of the system which has far outweighed any advantages otherwise gained. No system is known which has been found entirely acceptable from the standpoint of resistance to cracking or spalling under the more severe conditions of use to which such systems are frequently put.

I have found that a heat transfer system for the above-described use, as well as for use in various heat regenerative furnace constructions, and having an improved resistance to heat shock while at the same time maintaining a high degree of ruggedness of structure and high efficiency in heat transfer properties can be obtained at a minimum of cost by constructing a checker work from a plurality of simple ring-shaped unit shapes which are preferably completely open at one side by reason of the severing or omission of a small segment of the ring. The ring shapes from which the heat transfer checker work systems are constructed in accordance with the present invention lend themselves readily to several different arrangements whereby the heat transfer system constructed thereof is designed to meet the specific requirements for the particular operation to which the system is to be applied. Highly satisfactory results are obtained when the unit ring shapes from which the system is made are of such size and shape that the vertical radial cross-section of each ring approaches the cross-section of a square and is of sufficient massiveness to give the ring body adequate heat capacity to perform its heat storing and dissipating functions effectively.

A heat transfer checker work constructed of a plurality of horizontal courses of the herein described rings can be readily cleaned of carbon or other solid matter at desired intervals since the rings can be assembled in a plurality of horizontal courses with each individual ring shape of one horizontal course in vertical axial alignment with correspondingly positioned rings in the remaining horizontal courses of the system. Also, the resulting checker work can be readily cleaned when the rings are so arranged that the rings of one horizontal course are staggered laterally with respect to the rings of adjoining horizontal courses so that the central holes defined by the rings of one course are substantially in alignment with the open spaces formed between contiguous rings of the adjoining courses.

Figure 2:
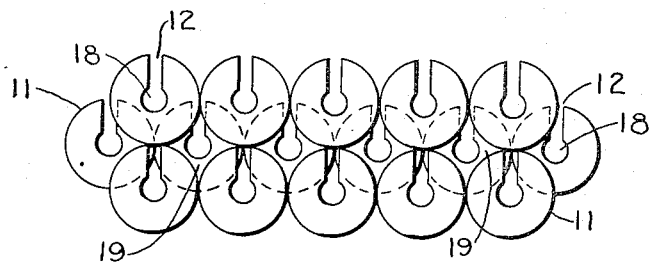
Figure 3:
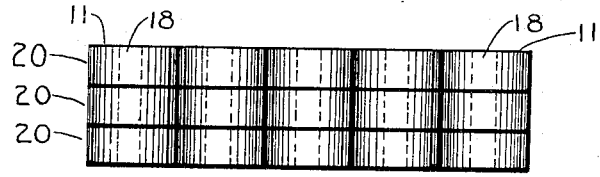
Figure 4:
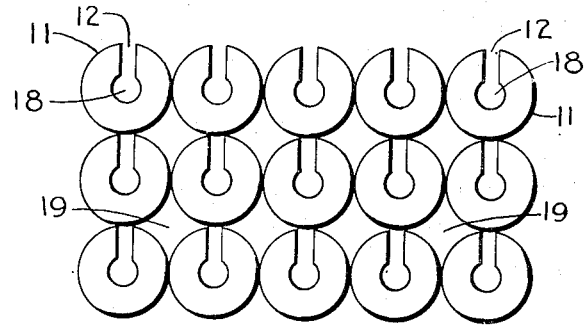
Figure 5:
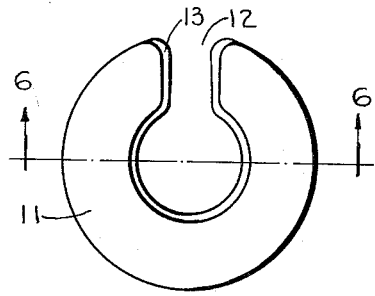
Figure 6:
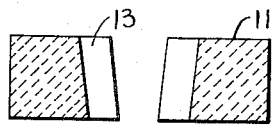
Figure 7:
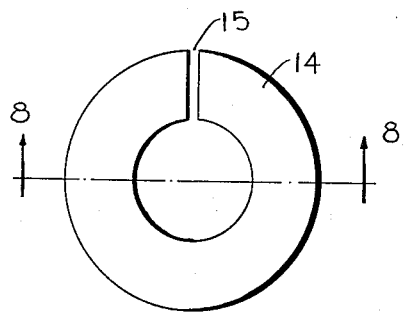
Figure 8:
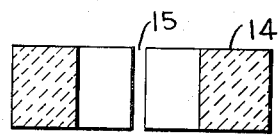
Figure 9:
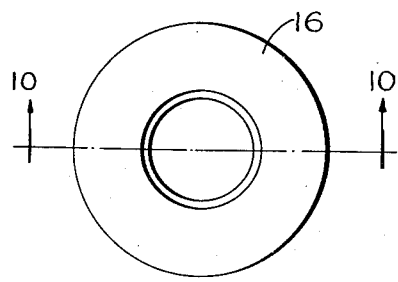
Figure 10:

In order that the invention may be more clearly understood reference is made to the various figures of the drawing, in which Figure 1 is a side elevational view of a heat transfer checker work composed of the unit ring shapes of the present invention and depicts one form of arrangement wherein the unit shapes of one horizontal course are staggered with respect to the unit shapes of the adjoining horizontal courses, Figure 2 is a top plan view of the heat transfer checker work shown in Figure 1, Figure 3 is a side elevational view of a heat transfer checker work constructed of the same ring shapes, but in which the unit shapes of each horizontal course have been arranged in vertical alignment with the rings of adjoining courses, Figure 4 is a top plan view of the heat transfer checker work shown in Figure 3, Figures 5 and 6 are top plan and vertical sectional views, respectively, of a unit ring shape made in accordance with the present invention, Figures 7 and 8 are top plan and vertical sectional views, respectively, of a modified form of heat transfer unit shape made in accordance with the present invention, and Figures 9 and 10 are top plan and sectional views, respectively, of still another modification of the present invention.

Referring further to the drawings, Figures 5 and 6 depict a specific ring shape which has been found highly satisfactory for constructing heat transfer checker work systems in accordance with the present invention. The shape shown consists of a massive circular collar or ring 11 in which a small segment of one side of the ring has been omitted to provide an open space 12. This ring-shaped unit is therefore in the form of an incomplete annulus of slightly less than 360° in circumference, with the sides of the opening being completely disconnected. The vertical radial cross-section of the ring is substantially square with the inner wall 13 provided with a slight taper to facilitate removal from the mold in the course of its manufacture.

A typical size of ring shape which has been found exceptionally resistant to cracking and spalling when subjected to severe heat shock, and which is highly effective in performing heat transfer duties has been a ring shape of the contour shown in Figure 5 having an outside diameter of 8" and an inside diameter of approximately 3¼ to 3½" and 2½" in height with the inside wall provided with a ⅛" taper from top to bottom. The span of the omitted segment of the ring is approximately 1½". Although I have given above the specific dimensions for a typical ring shape made in accordance with the present invention it is to be understood that those dimensions are purely illustrative and are not intended in any way to restrict the ring shapes of the present invention to any specific size either in respect of the overall diameter of the ring shape, the inner diameter of the central opening, the thickness of the piece or the extent of the omitted segment of the ring since such details will depend entirely upon the size and shape of the chamber in which the heat transfer system is to be installed and other particular factors involved in the construction of the entire system and use thereof.

Figures 7 and 8 show a modified ring shape made according to the present invention in which the unit shape is made by first forming a complete ring 14 of the desired size and subsequently severing the ring at one point in its circumference to provide an opening 15 in one side of the ring. Ring shapes of the described type have been found similarly resistant to heat shock and equally effective in use with those made according to Figures 5 and 6 in which the ring shape is molded directly to the final form. Again, it is desirable for best results that the ring be of massive proportions with the radial vertical cross-section of the ring approaching squareness.

Figures 9 and 10 show a modified form of ring shape in which the ring 16 is made the same as the ring shown in Figures 7 and 8 with the exception that the ring is continuous. While this particular modification has been found to be superior to conventional rectangular shapes heretofore used it has not been found as resistant to heat shock as those ring shapes in which a small segment of the ring has been severed or omitted. However the shape has been found entirely satisfactory for use under less severe conditions of heat shock.

Referring to Figures 1 and 2 the ring shapes of the present invention can be arranged to form a heat transfer checker work by arrangement in a number of different ways. For example, in Figures 1 and 2 the rings have been arranged in a plurality of horizontal courses 17 to form a checker work in which the rings of one horizontal course have been staggered laterally with respect to the rings of the adjoining horizontal courses whereby the central holes or openings 18 of the rings of one course are in vertical alignment with the spaces 19 between contiguous rings of the adjoining horizontal courses of ring shapes. Such an arrangement of ring shapes forms a checker work system in which there are a plurality of vertical passages extending through the entire checker work so that the system can be cleaned of carbon deposits whenever desired without disturbing the checker work system. At the same time the irregularity of the walls of such vertical passage tends to promote sufficient turbulence in the gases or fluids passing therethrough that efficient heat transfer is accomplished.

Figures 3 and 4 depict an alternate form of arrangement for a heat transfer checker work system in which the individual ring shapes 11 are assembled in a plurality of horizontal courses 20 with the central spaces or holes 18 in the rings of one horizontal course being arranged in coaxial vertical alignment with the central openings 18 in corresponding rings of the remaining horizontal courses. Similarly, the spaces between contiguous rings of one horizontal course are in vertical alignment with the spaces formed by correspondingly positioned contiguous rings of the other horizontal courses. Such an arrangement is particularly suitable where a rapid flow of gases through the system and ease of cleaning the system from carbon deposits are of tantamount importance.

It is also possible to arrange the rings of the checker work in combinations of the staggered arrangement of Figures 1 and 2 and the stacked arrangement of Figures 3 and 4 wherein the rings of two or more adjoining horizontal courses are coaxially aligned, the thusly aligned plurality of courses being in turn staggered laterally with other groups of courses as described in Figures 1 and 2.

Where operations do not require periodic cleaning of carbon deposits from the system and it is desired to provide the most tortuous path for the flow of gases or liquids through the heat transfer chamber the ring shapes herein described can be arranged in rows on their sides in orderly fashion or the rings can be placed in the heat transfer chamber in heterogeneous fashion although for most operations it will be found that best results can be obtained when one or the other of the first above two systems of arrangement is employed.

Regardless of the specific arrangement of the herein described ring shapes in the making up of the heat transfer checker work the same high degree of resistance to heat shock will be obtained since the high resistance to spalling and cracking in heat transfer systems of the present invention is dependent upon the specific unit ring shape rather than upon the arrangement of the shapes within the system.

Although the present invention is applicable to heat transfer unit shapes regardless of the specific composition used to form the refractory shape, I have found that a refractory material which has a high heat capacity and high thermal conductivity such as a bonded silicon carbide body to be highly satisfactory for such use and far superior to fire clay or other less refractory materials due to its greater refractoriness, thermal conductivity and the like, although fire clay compositions and other less refractory materials may be used where they are adequate to stand up under the operating conditions to which the shapes are to be subjected. Monolithic fused cast refractory shapes, made by fusing the desired refractory composition to a molten condition and pouring it in a mold and slowly cooling it to form the desired shape, can also be used since such refractory bodies have a high thermal conductivity which renders them suitable for such use, although the compositions of such fused cast bodies should be selected to provide the maximum possible resistance to heat shock. One such fused cast material of relatively good heat shock resistance is a fused cast alumina body containing small amounts of alkaline oxides.

When bonded shapes are used, any of the conventional molding means of obtaining a bonded body, all as is well known in the art, such as pressure molding, machine tamping, hand tamping, jolting, vibrational tamping, air hammer tamping, or slip-casting, can be employed.

While I have described the present invention as being particularly applicable to those heat transfer systems involved in the cracking of oils and manufacture of gas, the herein described shapes and the heat transfer systems constructed therefrom are equally applicable in heat transfer systems for other uses such as the conventional furnace heat regenerative systems which are used in many types of furnace constructions for the storage and utilization of the heat from waste gases of combustion and the like.

Having described the invention it is desired to claim:

1. A heat transfer checker work unit ring-shaped refractory body, said ring being completely open at one side by omission of a small segment thereof so as to be in the form of an incomplete annulus of slightly less than 360° in circumference with the sides of the opening being completely disconnected.

2. A heat transfer checker work unit ring-shaped refractory body, said ring being completely open at one side by omission of a small segment thereof so as to be in the form of an incomplete annulus of slightly less than 360° in circumference with the sides of the opening being completely disconnected, the vertical radial cross-section of said ring approaching that of a square.

3. A heat transfer checker work unit ring-shaped refractory body, said ring being completely open at one side by omission of a small segment thereof so as to be in the form of an incomplete annulus of slightly less than 360° in circumference with the sides of the opening being completely disconnected, the radial thickness and height of said ring being of substantially the same order of magnitude.

4. A heat transfer checker work system comprising a chamber containing a plurality of refractory checker ring-shaped bodies, each of which is completely open at one side by omission of a small segment thereof so as to be in the form of an incomplete annulus of slightly less than 360° in circumference with the sides of the opening being completely disconnected.

5. A heat transfer checker work system comprising a chamber containing a plurality of refractory checker ring-shaped bodies, each of which is completely open at one side by omission of a small segment thereof so as to be in the form of an incomplete annulus of slightly less than 360° in circumference with the sides of the opening being completely disconnected, the vertical radial cross-section of said ring approaching that of a square.

6. A heat transfer checker work system comprising a chamber containing a plurality of bonded silicon carbide refractory ring-shaped bodies, each of which is completely open at one side by omission of a small segment thereof so as to be in the form of an incomplete annulus of slightly less than 360° in circumference with the sides of the opening being completely disconnected.

7. A heat transfer checker work system comprising a chamber containing a plurality of refractory checker ring-shaped bodies, each of which is completely open at one side by omission of a small segment thereof so as to be in the form of an incomplete annulus of slightly less than 360° in circumference with the sides of the opening being completely disconnected, said ring shapes being arranged in a plurality of horizontal courses so that the shapes of one horizontal course of the checker work are laterally staggered with respect to the shapes of adjoining horizontal courses so that the central open spaces within the individual rings of one course are in substantially vertical alignment with the open spaces formed between contiguous rings of the adjoining horizontal courses.

8. A heat transfer checker work system comprising a chamber containing a plurality of refractory checker ring-shaped bodies, each of which is completely open at one side by omission of a small segment thereof so as to be in the form of an incomplete annulus of slightly less than 360° in circumference with the sides of the opening being completely disconnected, said shapes being arranged in a plurality of horizontal courses with each individual ring shape of each horizontal course being in vertically coaxial alignment with a corresponding ring shape in each of the other horizontal courses.

JOHN P. SWENTZEL.

References Cited in the file of this patent

UNITED STATES PATENTS

| Number | Name | Date |
|---|---|---|
| 1,496,036 | Tone | June 3, 1924 |
| 1,951,047 | Brown, Jr. et al. | Mar. 13, 1934 |
| 1,973,851 | Feiler et al. | Sept. 18, 1934 |
| 2,532,112 | Mackensen | Nov. 28, 1950 |

FOREIGN PATENTS

| Number | Country | Date |
|---|---|---|
| 139,880 | Great Britain | Mar. 18, 1920 |
| 289,282 | Great Britain | Apr. 26, 1928 |
| 431,309 | Great Britain | July 4, 1935 |
| 694,430 | France | Dec. 3, 1930 |